United States Patent [19]

Bekki et al.

[11] Patent Number: 5,422,965
[45] Date of Patent: Jun. 6, 1995

[54] AIR BAG OPERATION DEVICE

[75] Inventors: Keisuke Bekki, Hitachi; Hiroshi Sato, Katsuta; Korefumi Tashiro, Hitachi; Seiko Suzuki; Masayoshi Suzuki, both of Hitachioota, all of Japan

[73] Assignee: Hitachi, Ltd., Japan

[21] Appl. No.: 17,389

[22] Filed: Feb. 12, 1993

[30] Foreign Application Priority Data

Feb. 18, 1992 [JP] Japan ................................ 4-030665

[51] Int. Cl.⁶ .............................................. B60R 21/32
[52] U.S. Cl. ..................... 364/424.05; 364/424.03; 280/735
[58] Field of Search ............... 364/424.05, 424.03, 364/431.12; 280/735, 731, 729, 734; 307/10.1, 10.3, 10.6; 180/271, 274; 340/438, 436

[56] References Cited

U.S. PATENT DOCUMENTS

| | | | |
|---|---|---|---|
| 4,950,914 | 8/1990 | Kurihara et al. | 307/10.1 |
| 4,958,851 | 9/1990 | Behr et al. | 280/735 |
| 4,999,775 | 3/1991 | Muraoka | 364/424.03 |
| 5,018,763 | 5/1991 | Okano et al. | 280/735 |
| 5,081,442 | 1/1992 | Ito et al. | 340/438 |
| 5,101,192 | 3/1992 | Ishizuka | 340/436 |
| 5,164,901 | 11/1992 | Blackburn et al. | 36/424.05 |
| 5,182,459 | 1/1993 | Okano et al. | 307/10.1 |
| 5,208,484 | 5/1993 | Okano et al. | 340/436 |
| 5,229,943 | 7/1993 | Eigler et al. | 364/424.05 |
| 5,261,694 | 11/1993 | White et al. | 280/735 |

FOREIGN PATENT DOCUMENTS 1-168545  4/1989  Japan .

OTHER PUBLICATIONS

"Sensing and Systems Aspects of Fault Tolerant Electronics Applied to Vehicle Systems," Milt Baker, et al., Motorola, Inc., pp. 45–54 (1989).

*Primary Examiner*—Kevin J. Teska
*Assistant Examiner*—Tan Nguyen
*Attorney, Agent, or Firm*—Evenson, McKeown, Edwards & Lenahan

[57] ABSTRACT

An air bag operation device which employs only one CPU module to guarantee sufficient fail-safety in the operation of the air bag without increasing the scale of the hardware. A plurality of crash-discriminating programs of different versions and a plurality of self-diagnosing programs of different versions are executed by a single CPU module, a signal is fed to an air bag igniting device based upon a comparison of the discriminated results by the plurality of crash-discriminating programs, and a signal is fed to an abnormality alarm device based upon comparison of the discriminated results of the plurality of self-diagnosing programs.

25 Claims, 9 Drawing Sheets

RESULT OF INITIAL DIAGNOSIS

| OUTPUT OF REGISTER X | | OUTPUT OF FREQUENCY LOGIC FAILSAFE CIRCUIT | |
|---|---|---|---|
| BITS 1~4 | BITS 5~8 | TO IGNITER | TO ALARM |
| f0 | f0 | 0 | f2 |
| f1 | 0 | f2 | f2 |
| 0 | f1 | 0 | f2 |
| | | 0 | 0 |

SELF-DIAGNOSIS-NORMAL
CRASH
NO CRASH
FAULT

FIG. 10

AIR BAG OPERATION DEVICE

BACKGROUND OF THE INVENTION

The present invention relates to an air bag device that maintains safety for the passengers in a vehicle crash, and particularly to an air bag device adapted for use in automobiles.

In order to improve reliability of processing in an air bag control, known prior art controls use two CPUs to perform the same processing, the results are compared by a comparator (that is not guaranteed fail-safe), and an operation signal is output to the air bag device only when the results processed by the two CPUs are the same. Such a control arrangement is described, for example, in SAE Paper 901123 "Sensing and Systems Aspects of Fault Tolerant Electronics Applied to Vehicle Systems."

In Japanese Laid-Open Patent Publication No. 168545/1989, furthermore, a diagnosing circuit (which is likewise not guaranteed for fail-safety) is added to detect any fault that has developed in the air bag device. In this manner, a fault in the system is removed as early as possible, in order to improve reliability. Methods for detecting the occurrence of a failure in computer systems by means of regular self diagnosis are also used in fault tolerant systems, such as railway controls, for example.

One disadvantage of the above-mentioned conventional systems is that two CPU modules (CPUs and memories) are required, which not only adds expense, but also makes the hardware bulky. Moreover, despite the redundant processing of data, it is still possible for such devices to inflate the air bag in the absence of a crash, which poses a serious safety hazard, especially if such erroneous inflation occurs at high vehicle speed. On the other hand, if the air bag fails to inflate in the event of a crash in which it should have been inflated, there is a substantial likelihood that the driver will be killed.

Such processing which affects the human life must be guaranteed fail-safe. However, according to the method of the prior art, though relatively high reliability has been maintained, fail-safety has not been guaranteed.

SUMMARY OF THE INVENTION

An object of the present invention is to provide an air bag operation device which guarantees sufficient fail-safety for the operation of the air bag by using only one CPU module, without increasing the size of the hardware.

This object is accomplished by the control arrangement according to the invention, which utilizes a single CPU module, provided with a plurality of crash-discriminating programs of different versions and a plurality of self-diagnosing programs of different versions. Operation signal generation processing on the air bag device according to the invention is based on a comparison of the results provided by the plurality of versions of crash-discriminating programs. In addition, abnormality alarm display processing is also provided, based on the comparison of the discriminated results by the plurality of self-diagnosing programs.

According to the invention, the CPU module receives an output signal from a crash sensor that detects the acceleration and outputs a value corresponding thereto. Upon receipt of a signal from the crash sensor, the CPU module determines whether or not the signal is due to a crash, relying upon the results received from a plurality of different versions of crash-discriminating programs. The CPU module sends the plurality of discriminated results as alternating signals having a predetermined frequency to a frequency logic fail-safe circuit.

At all times when there is no input signal from the crash sensor, the CPU module operates a plurality of versions of self-diagnosing programs, so that it continuously checks the CPU itself, the memory and the peripheral equipment (power source, crash sensor, abnormality warning display, air bag igniter, etc.) to determine whether a failure exists in the system. The CPU module also sends the plurality of the self-diagnosed results as alternating signals of a predetermined frequency to the frequency logic fail-safe circuit.

In the event that such alternating signals are no longer produced, or when signals of an incorrect frequency are output from the CPU module, the frequency logic fail-safe circuit fixes the output to the air bag at a value which will not inflate the air bag and, at the same time, outputs a signal to an alarm device to warn of the occurrence of an abnormal condition. Furthermore, if the frequency logic fail-safe circuit itself becomes defective, it likewise fixes the output to the air bag igniting device to a value that does not inflate the air bag and, at the same time, outputs an alarm signal in the same manner as in the event of a crash. Thus, if an abnormal condition (a fault) develops in any part of the air bag system, it can be reliably detected by the plurality of self-diagnosing programs, and can be displayed so far as the CPU module is properly functioning.

Moreover, although the plural versions of crash-discriminating programs and self-diagnosing programs have the same function and perform the same diagnosis, they are so constituted as to use separate instructions, registers and memories to the greatest extent possible. Therefore, if a fault develops in the CPU module which causes it to produce an erroneous output, the results of the plurality of self-diagnosing programs will be inconsistent with each other. Moreover, since the diagnosed result is discriminated based on the outputs of the plurality of these programs, any such fault will cause the frequency logic fail-safe circuit to send a signal to the alarm device to warn of the occurrence of an abnormal condition. Thus, a fail-safety guaranteed air bag system is provided.

According to the present invention in which a fault alarm and an air bag ignition signal are output from the fail-safe circuit, the following two features can be guaranteed:

(1) The air bag is never inflated erroneously when the car is driven ordinarily; and (2) When the car has crashed and no fault alarm is being produced, the air bag is inflated without fail.

Other objects, advantages and novel features of the present invention will become apparent from the following detailed description of the invention when considered in conjunction with the accompanying drawings.

DETAILED DESCRIPTION OF THE DRAWINGS

Figure 1:
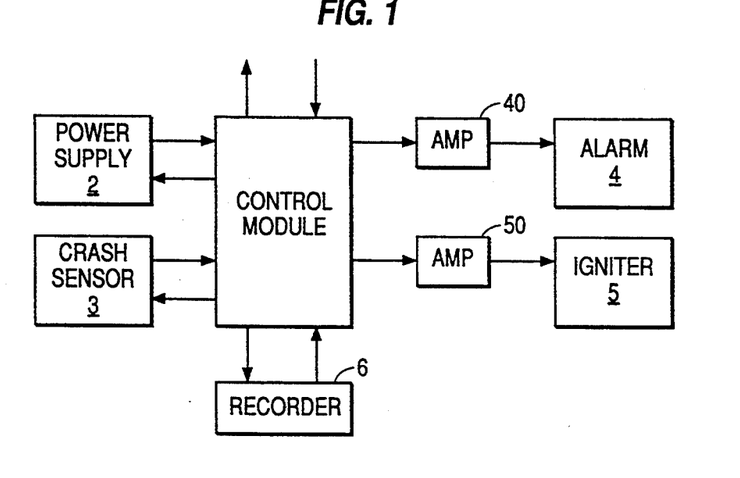
FIG. 1 is a block diagram which shows an air bag operation device according to the present invention.

FIG. 1 illustrates an embodiment of the present invention which is constituted by a control module 1 that controls the air bag system, a power supply unit 2 for supplying electric power to the air bag system, a crash sensor 3 including a detector which detects a negative acceleration, an alarm device 4 which indicates the occurrence of an abnormal condition (fault) in the air bag system so that the driver may perceive it, an air bag igniting device 5 which causes the air bag to be inflated in case of a crash, and a recorder 6 which records the occurrence of a crash.

The control module 1 sends predetermined diagnostic signals to the power source unit 2, crash sensor 3, alarm device 4, air bag igniting device 5 and recorder 6, and examines responses therefrom, in order to diagnose these portions in the manner disclosed, for example, in U.S. Pat. No. 4,999,775.

Figure 2:
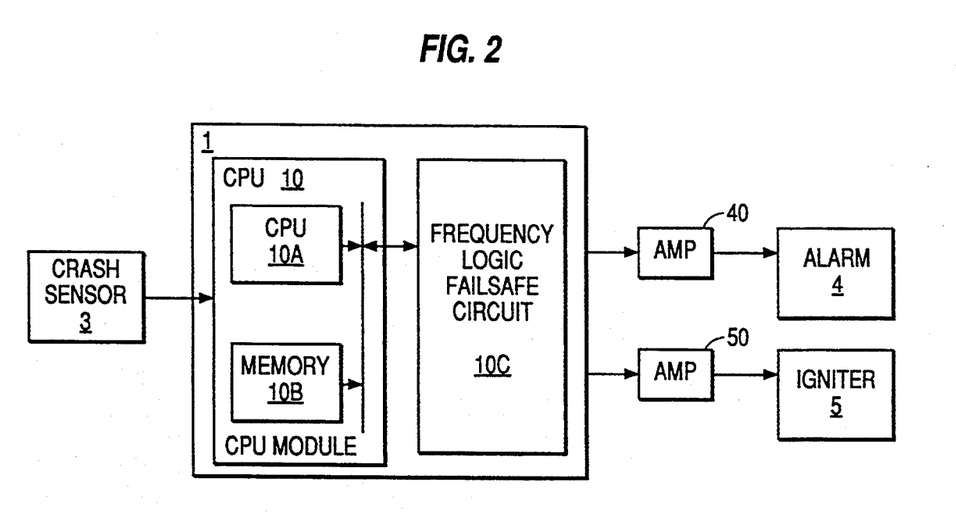
FIG. 2 is a block diagram which shows in greater detail the air bag operation device according to the present invention.

FIG. 2 shows the details of the control module 1, which is constituted by a frequency logic fail-safe circuit 10C and a CPU module 10 which is made up of a CPU 10A and a memory 10B.

The AC-driven amplifiers 40 and 50 will be described later. When a signal of a level "1" is input from the AC-driven amplifier 40, the abnormality alarm device 4 performs the display operation in a predetermined manner, so that the driver of the car is informed of the occurrence of any abnormal condition in the air bag system. That is, the driver of the car is informed that the air bag will not work, even in case of a crash. Upon receipt of a signal of the level "1+ from the AC-driven amplifier 50, on the other hand, the air bag igniting device 5 operates to inflate the air bag (not shown).

The control module 1 receives a crash signal from the crash sensor 3, and the CPU module 10 determines whether or not the car has actually crashed. When it is determined by the CPU module 10 that the car has crashed, the CPU module 10 outputs an air bag igniting signal to the frequency logic fail-safe circuit 10C to inflate the air bag.

The frequency logic fail-safe circuit 10C determines whether or not a correct output is produced from the CPU module 10. When the output is determined to be correct, the air bag igniting device 5 is actuated to inflate the air bag. Thus, the frequency logic fail-safe circuit 10C literally has a fail-safe function, and the processing steps according to the invention are all fail-safe. (As the term is used herein, a fail-safe circuit is a circuit which produces a predetermined signal without fail in case a fault has occurred inside the circuit.)

Figure 3:
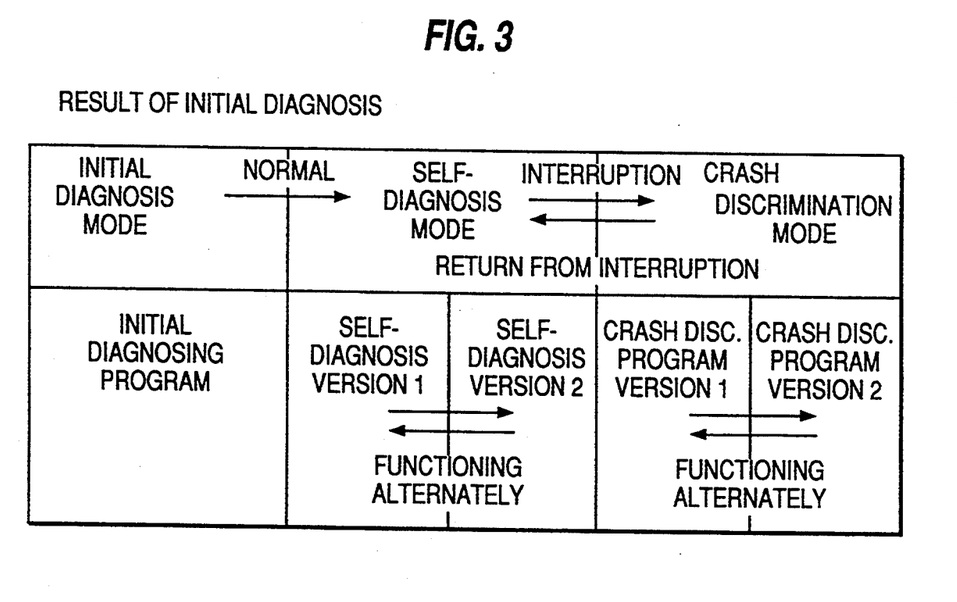
FIG. 3 is a diagram explaining the operation of the present invention.

FIG. 3 illustrates the processing steps executed by the CPU module 10. In the air bag system as described above, the occurrence of a fault anywhere in the system (including the CPU module 10) that may lead to erroneous control must be detected by the fail-safe circuit. As shown in FIG. 2, furthermore, the air bag system has only one CPU, which is provided with a plurality of programs having the same function, but being different versions. The programs are individually executed, and the results are compared by the fail-safe circuit in order to detect a fault in the CPU module.

When electric power supply 2 initiates the supply of electric power to the air bag system of the invention, the system first executes an initial diagnosis on the peripheral apparatus such as the crash sensor 3, power source unit 2, recorder 6, abnormality alarm device 4, and the igniter device 5, all connected to the CPU. If an abnormal condition is detected by the initial diagnosis, the output values to the frequency logic fail-safe circuit 10C are all fixed to 0, and subsequent processing is discontinued. When no abnormal condition is detected in the initial diagnosis, the system transfers to the self diagnosis made, in which two versions of a self-diagnosing program are executed alternately as shown in FIG. 3 in order to detect any fault in the CPU module 10. The purpose of the self-diagnosing programs executed in the self-diagnosing mode is to check the memory and bus used by the CPU 10A and the instructions of the CPU, which detect the crash.

Figure 4:
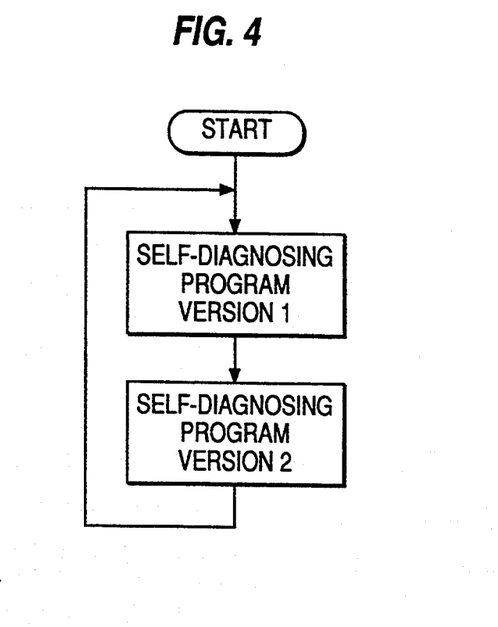
FIG. 4 is a flow chart illustrating operating steps performed by the present invention.

FIG. 4 illustrates the application of the self-diagnosing programs when there is no input signal from the crash sensor 3. In this event, two kinds of programs—i.e., version 1 and version 2—are always alternately applied.

Figure 5A:
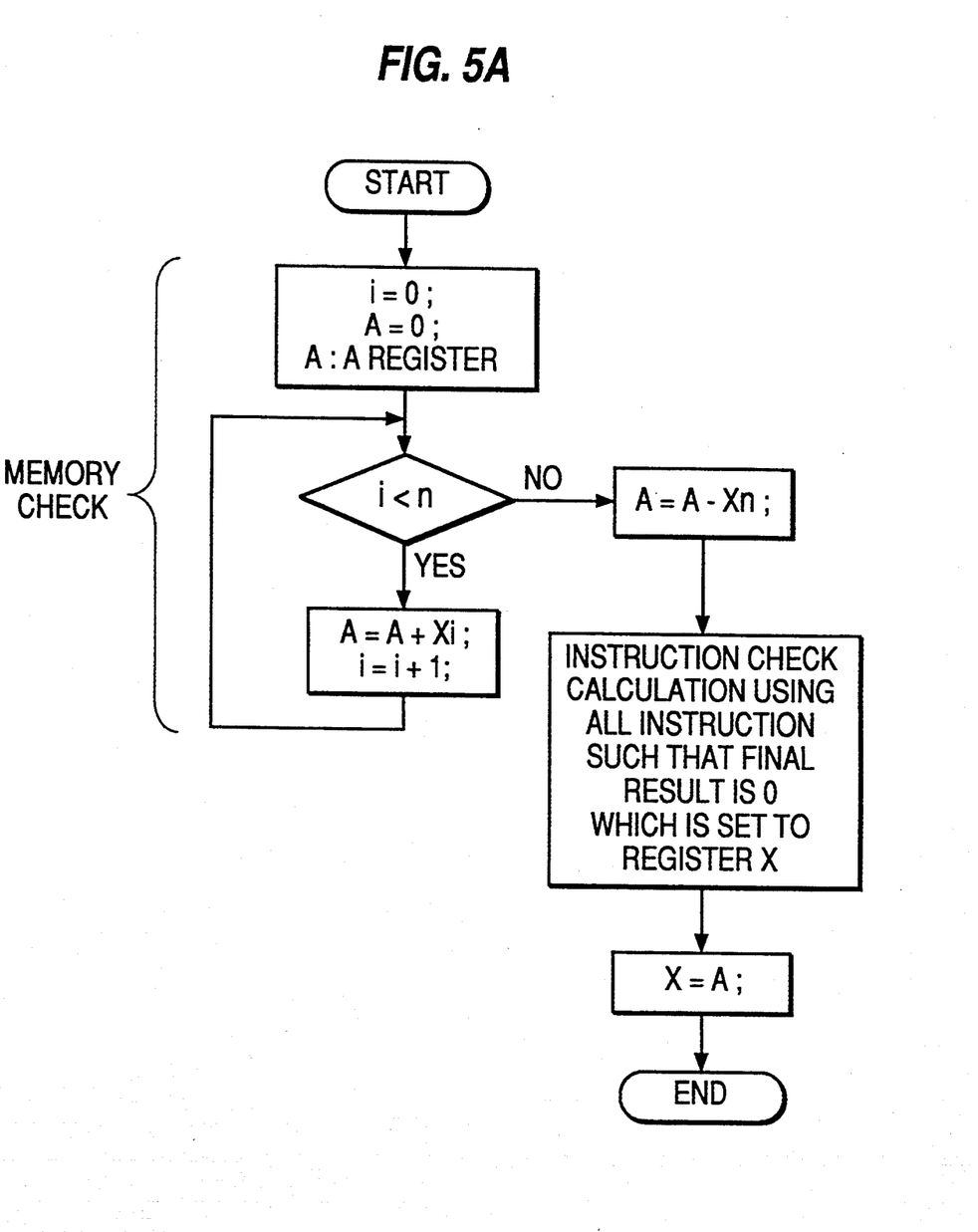
FIGS. 5A and 5B are flow charts illustrating additional operating steps performed by the present invention.
Figure 5B:
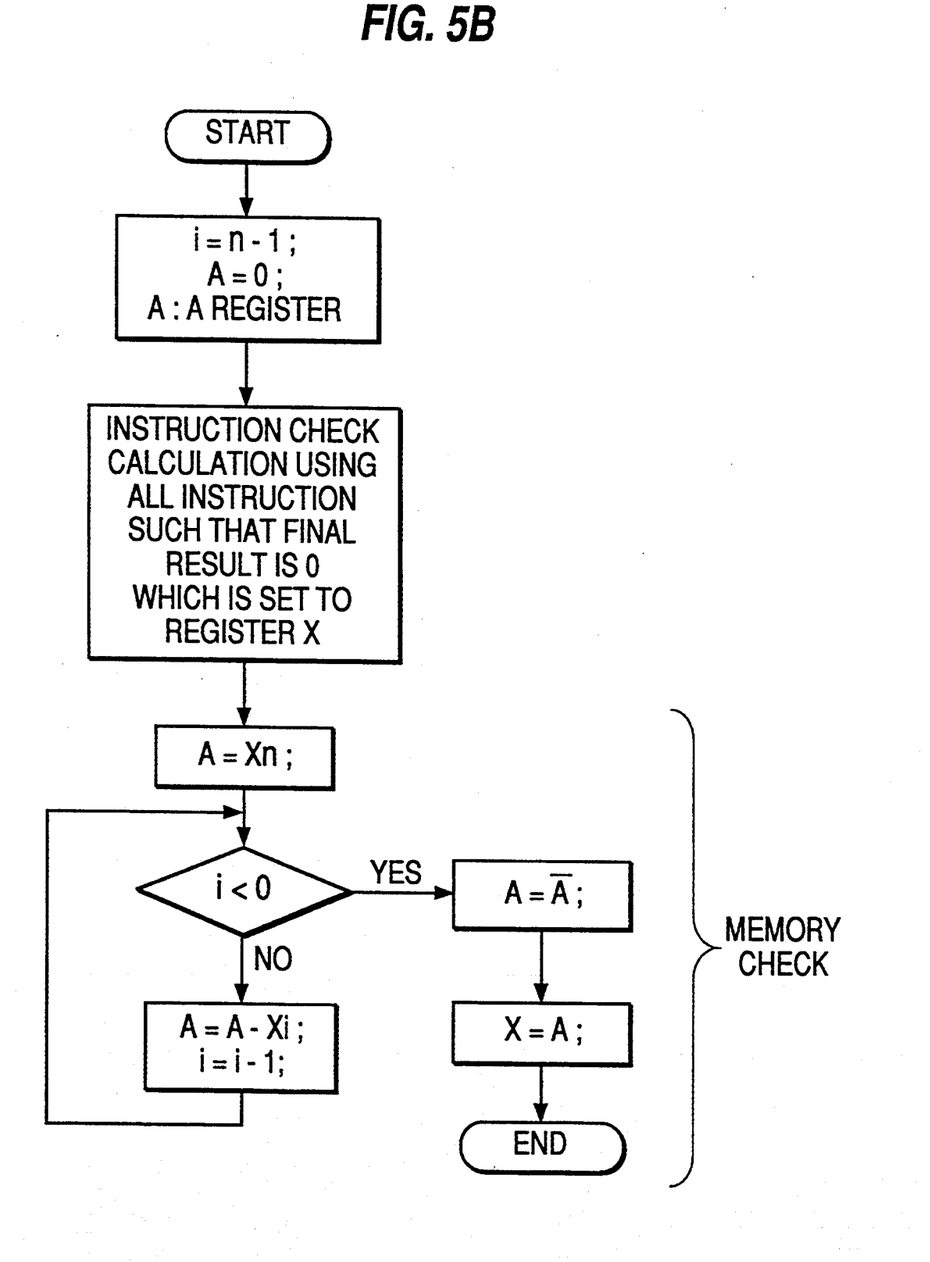

FIGS. 5A and 5B are flow charts illustrating the processing steps performed by the first and second versions of the self-diagnosing program. The first version first checks the content of the memory (n bytes having address 0−n, containing data $X_o - X_n$), used for detecting a crash. $X_n$ is a test value for the sum check, selected such that $X_0 + X_1 + - - - + X_{n-1} = X_n$. The values from $X_0$ to $X_{n-1}$ are added in the A register, and the final calculation, $A = A - X_n$, is performed after finishing of the above described additional calculation. Accordingly, the value in the A register becomes 00 (16 order system expression) when no failure exists in the system. Next, an instruction check of the CPU is performed, in which a diagnostic calculation (such as sum check, or the like) is performed in a known manner such that when the value of the A register before the calculation is 00 (16 order system), the value of the A register as the result of the calculation is also 00 (16 order system). And, a binary data word obtained by the diagnosis is entered in a predetermined register X in the CPU. Accordingly, as a result of the check, if no abnormality is detected, an 8-bit binary data word 00000000 is entered into the register X, but if an abnormality is detected, a value other than 00000000 is entered into the register X.

The second version of the self-diagnosing program (FIG. 5B) first resets the values of the register A and index i, and then checks the instruction of the CPU. For this purpose, a diagnostic calculation (such as sum check, etc.) is performed in the same manner as in the first version of the self-diagnosing program, so that when the value stored in the A register before the calculation is 00 (16 order system), the value contained in the A register as the result of the calculation is also 00 (16 order system). The content of the memory (n bites having address 0−n, containing data $X_0-X_n$) used for detecting a crash is checked. $X_n$ is a test value for sum check, selected such that $X_0+X_1+\cdots+X_{n-1}=X_n$. The values from $X_0$ to $X_{n-1}$ are added in the A register, and the final calculation, $A=A-X_n$, is performed after finishing the above described additional calculation. Accordingly, the value in the A register becomes 00 (16 order system expression) when no failure exists in the system. Then, a number complementary to the value in the A register is calculated and re-entered into the A register, and the binary data word obtained by the diagnosis is entered in the predetermined register X in the CPU. Accordingly, as a result of the check, if no abnormality is detected, the 8-bit binary data 11111111 is entered into the register X, but if an abnormality is detected, a value other than 11111111 is entered into the register X.

Figure 6:
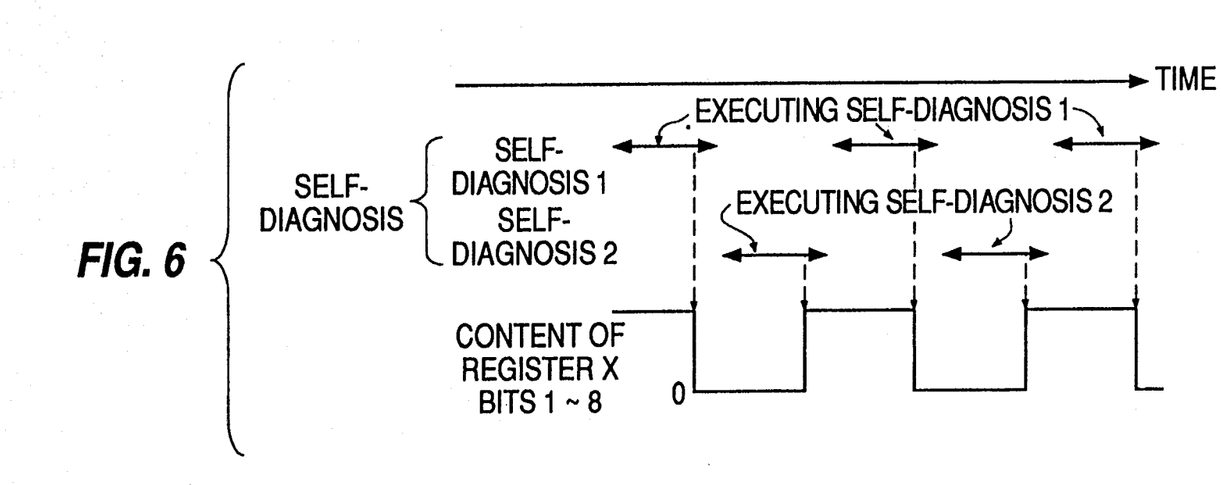
FIG. 6 is a timing chart for explaining the operation of the present invention.

As described above, and illustrated in FIGS. 3 and 4, these two versions of the self diagnosing program are alternated repeatedly in a manner as shown in FIG. 6. When they are properly operating with no abnormal condition, and the values of the 8 bits stored in the register X are read out serially, the output alternates between "1" and "0" at predetermined intervals as shown in FIG. 6. Therefore, alternating signals having a predetermined frequency $f_0$ are obtained by reading the data of bits 1 to 8 of the register X.

It is apparent that, according to the invention, the first and second versions of the self-diagnosing program have the same function. However, these two programs are so constituted as to use different instructions, registers and memories to the greatest extent possible, though they perform the same diagnosis. Therefore, if a fault develops for example, in the CPU 10A, and an incorrect value is output, the results of the two kinds of diagnosing programs become inconsistent. That is, the above described alternating pattern stops, at least for one or more bits among the 1st to 8th bit signals of the register X.

Figure 7:
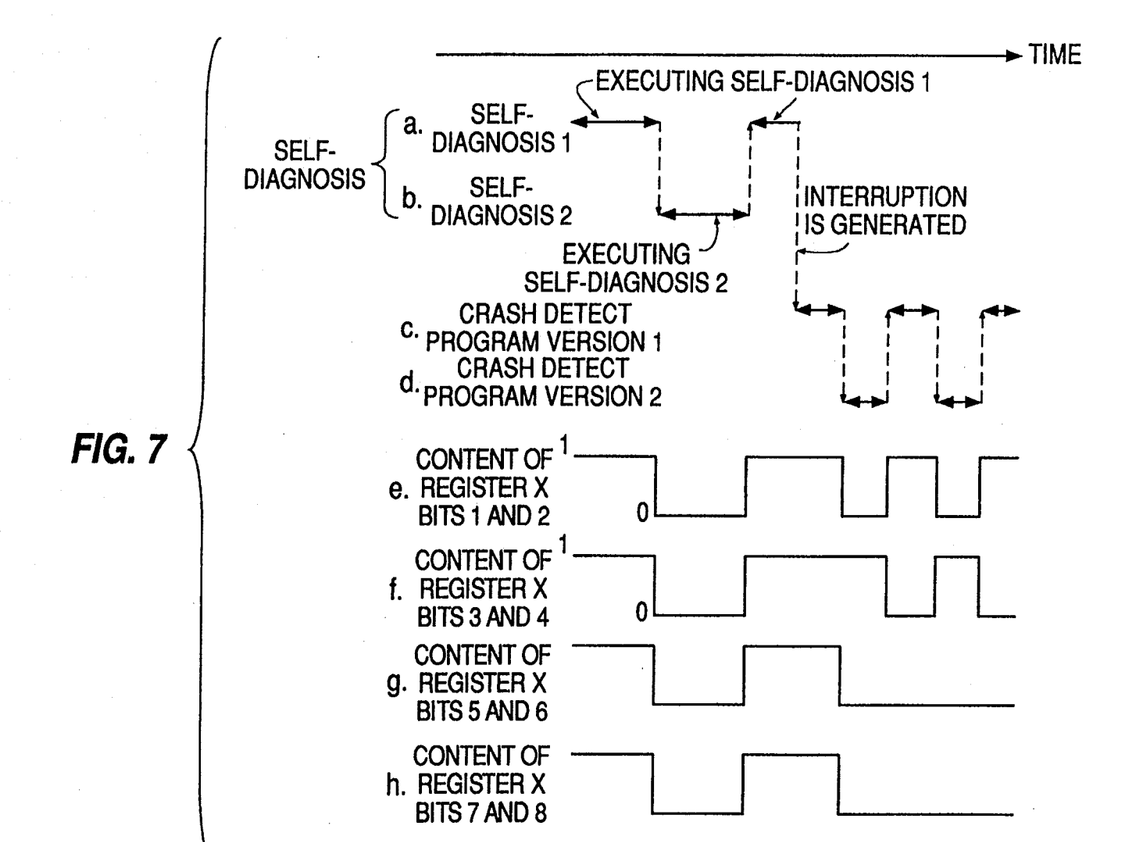
FIG. 7 is a second timing chart for explaining the operation of the present invention.
Figure 8:
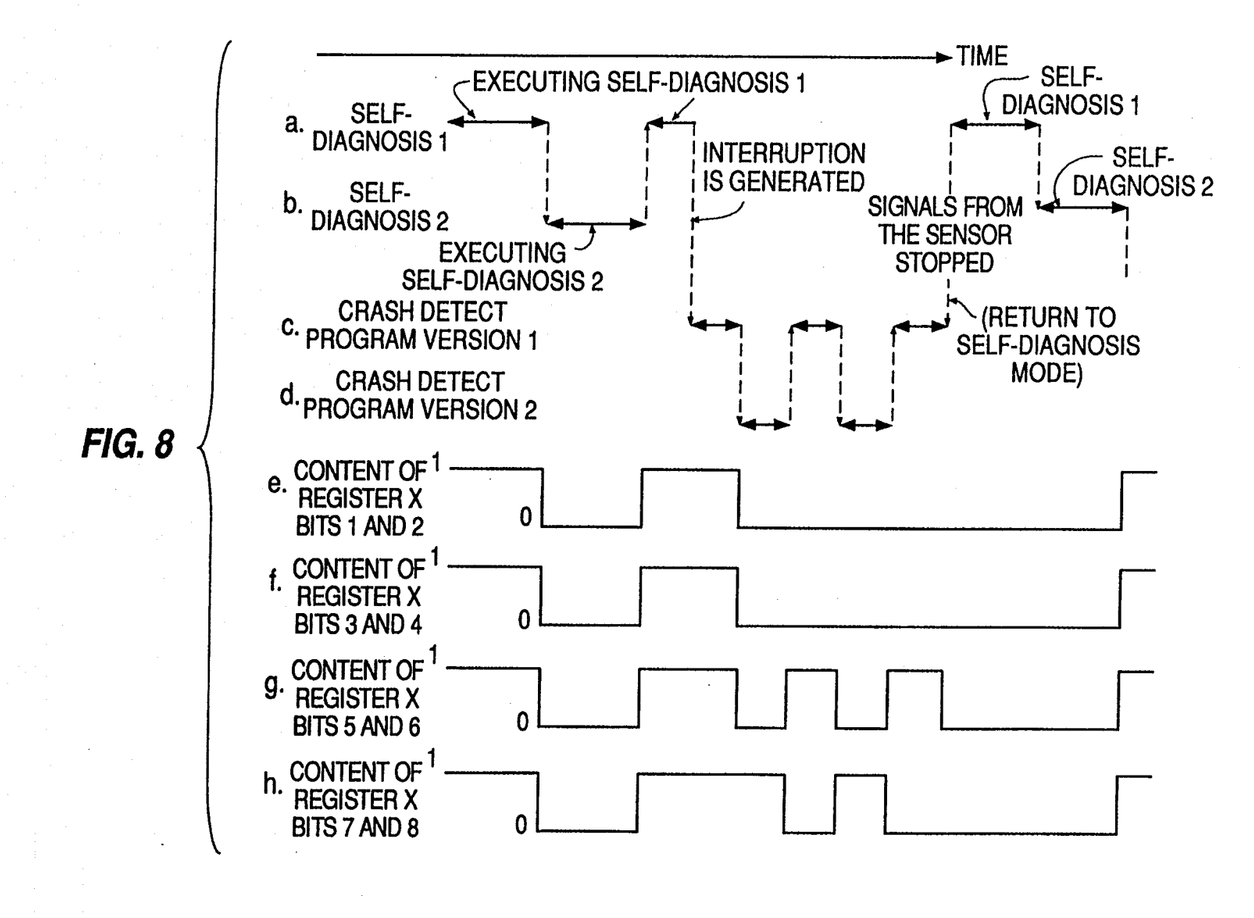
FIG. 8 is a third timing chart for explaining the operation of the present invention.

When, on the other hand, a crash signal is input to the CPU 10A from the crash sensor 3, the CPU operation in the self-diagnosing mode is interrupted, and the CPU shifts to the crash discriminating mode, which determines whether a crash has actually occurred, as shown in FIGS. 7 and 8.

Processing in the crash-iscriminating mode is constituted by two different versions of similar crash-discriminating programs, in a manner analogous to the processing in the self-diagnosing mode. Thus, when a crash signal is input from the crash sensor 3, the two versions of crash-diagnosing programs are executed alternately as shown in FIGS. 7 and 8.

The first version of the crash-discriminating program concludes that a crash has occurred when the level of an input signal from the crash sensor 3 exceeds a predetermined value (for example, when a predetermined acceleration is exceeded), and concludes that no crash has occurred when it does not exceed the predetermined value. The CPU is programmed to provide the 8-bit binary word 11000000 when it is determined that a crash has occurred as illustrated in FIG. 7. This binary word is stored in a predetermined register X in the CPU 10A. Next, the second version of the crash-discriminating program is run. Similarly to the first version, it concludes that a crash has occurred when the level of an input signal from the crash sensor (e.g., an acceleration measurement) exceeds a predetermined value, and that no crash has occurred when it does not exceed the predetermined value. When it is determined that a crash has in fact occurred (FIG. 7), the CPU is programmed to provide the 8-bit binary word 00110000, which is then stored in the predetermined register X in the CPU 10A, replacing the 8-bit binary word output by version 1.

Because the crash-discriminating programs of these two versions are alternated and executed repeatedly, when it is determined by the crash-discriminating program that a crash has occurred (as shown in FIG. 7), the values of the first and second bits stored in the register X form alternating signals of a predetermined frequency $f_1$, as shown in FIG. 7, line e, while the values of the third and fourth bits stored in the register X form alternating signals of frequency $f_1$, as shown in line f. The values of the fifth to eighth bits become zero, as shown in lines g and h.

When it is determined by the crash-discriminating program of the second version that no crash has occurred on the other hand, the CPU is programmed to generate the 8-bit binary word 00001100, which is stored in the register X in response to the calculation results of the first version of the crash discrimination program, and to generate the 8-bit binary word 00000011 in response to the calculation results of the second version, which is then entered in register X replacing the binary word 00001100 from the first version. (See FIG. 8.) Thus, the values of the first to fourth bits become zero as shown in lines e and f in FIG. 8, and the values of the fifth to eighth bits form alternating signals of the predetermined frequency $f_1$, as shown in lines g and h.

It is apparent that the first and second versions of the crash-discriminating program have the same function. However, these two programs are constituted so as to use different instructions, registers and memories to the greatest extent possible, though they perform the same crash-discrimination. Therefore, if a fault develops, for example, in the CPU 10A and an incorrect value is output, the results of the two programs become inconsistent, and the alternating signals of the register X cease to be produced.

In this regard it should be noted that a separate crash detection circuit for judging whether a crash has occurred may also be added directly to the crash sensor 3 itself, so that a crash signal is output only when a crash has occurred. In this case, an operation signal may be output directly to the air bag igniter 5, bypassing the crash discrimination mode subsequent to interruption of the self-discrimination mode.

The crash decision mode continues its operation as long as the signal from the crash sensor is input. During that time, when the signal level from the crash sensor does not reach a predetermined threshold value (indicating that no crash has occurred), the 5th to 8th bit values of the X register become an alternating signal. When the signal from the crash sensor is discontinued, the crash decision mode returns to the self diagnosis mode.

The frequency logic fail-safe circuit 10C (FIG. 1) is constituted by a logic circuit disclosed, for example, in U.S. Pat. No. 4,564,774, and executes the frequency logic operation shown in FIG. 9 to maintain fail-safety. Thus, when the air bag system is in the self-diagnosing mode and no abnormal condition is detected, the output signals from the register X in the CPU 10A form alternating signals of a frequency $f_0$. In this case, the frequency logic fail-safe circuit 10C outputs alternating signals of a frequency $f_2$ as signals to the abnormality alarm device 4, and outputs a value 0 as a signal to the air bag igniting device 5.

When the air bag system is in the crash-discriminating mode, and a crash has in fact occurred, the serial output signals of first to fourth bits of the register X in the CPU 10A form alternating signals of the frequency $f_1$ and other output signals (5th to 8th bits) are all 0. The frequency logic fail-safe circuit 10C then outputs alternating signals of the frequency $f_2$ to the abnormality alarm device 4 and outputs alternating signals of the frequency $f_2$ to the air bag igniting device 5 as shown in FIG. 9.

Moreover, when the air bag system is in the crash-discriminating mode and no crash has occurred, the output signals of the 1st to 4th bits of the register X are 0, and output signals of 5th to 8th bits form alternating signals of the frequency $f_1$. The frequency logic fail-safe circuit 10C outputs alternating signals of the frequency $f_2$ to the abnormality alarm device 4, and outputs a signal which is 0 to the air bag igniting device 5 as shown in FIG. 9.

Figure 9:
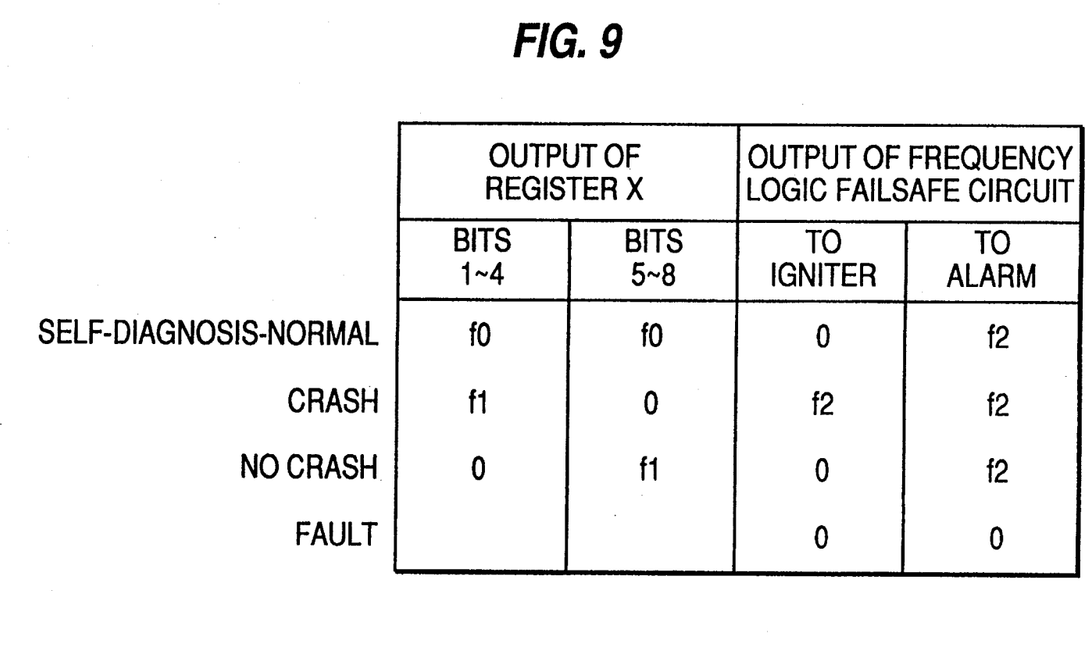
FIG. 9 is a table of truth values for explaining the operation of the frequency logic fail-safe circuit according to the present invention.

When input signals other than those mentioned above are input to the frequency logic fail-safe circuit 10C, then the frequency logic fail-safe circuit 10C fixes to 0 the output values fed to the abnormality alarm device 4 and to the air bag igniting device 5, as shown in the last line of FIG. 9. The output values are thereafter maintained at 0 and remain unchanged irrespective of any input signals received.

Figure 10:
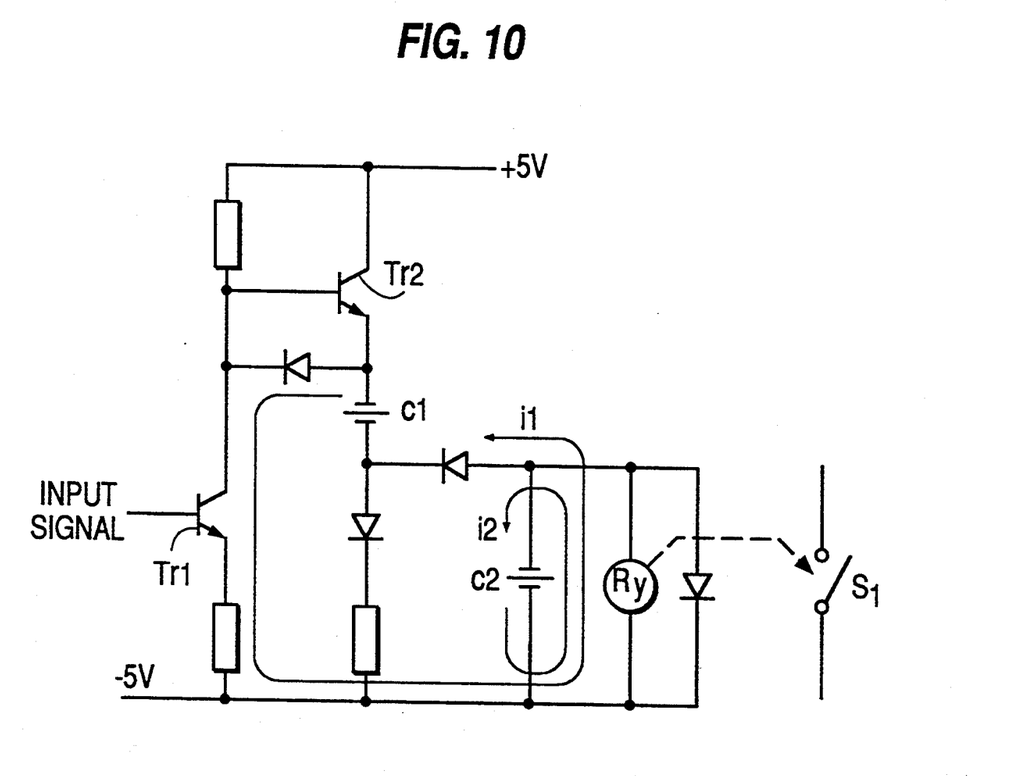
FIG. 10 is a partial circuit diagram of an AC-driven amplifier suitable for use in the air bag operation device according to the invention.

The outputs from the frequency logic fail-safe circuit 10C are connected to the fail-safe AC-driven amplifiers 40 and 50 which in turn are connected to the abnormality alarm device 4 and to the air bag igniting device 5, respectively. An example of such an AC-driven amplifier is shown in FIG. 10. When the input signal of the AC-driven amplified is H (high), Transistor $Tr_1$ turns on and Transistor $Tr_2$ turns to off. At this time, the electric charge in the capacitor $C_1$ flows as a current $i_1$, and charges the capacitor $C_2$. When input signal is L (Low), $Tr_1$ turns off and $Tr_2$ turns on. At this time, the electric charge in the $C_2$ flows as a current $i_2$, and $C_1$ is charged by the 5 volt supply via $Tr_2$. Accordingly, only when an alternating signal (repeating, signal of 0 and 1) is supplied as an input, a current continuously flows to the relay Ry. Such an amplifier is called a positive logic type AC-driven amplifier when an A conjunction relay is used for Ry (that is, the switch $S_1$ is closed when a current flows to Ry and open when no current flows), and a negative type AC-driven amplifier when a B conjunction relay ($S_1$ is closed when no current flows to Ry) is used for Ry.

For the AC-driven amplifier 40 connected to the alarm device, the negative type AC-driven amplifier is used. Thus, the circuit becomes a fail safe circuit which outputs a signal of the level "0" in response to an input alternating signal of the frequency $f_2$, and outputs a signal of the level "1" when a fault occurs in the amplifier or when the alternating signal (frequency $F_2$) of the input signals ceases. Consequently, when a fault occurs in the air bag system, occurrence of the fault is transmitted to the alarm device by the fail-safe processing. Furthermore, a positive type AC-driven amplifier 50 is connected to the air bag igniting device. Accordingly, the circuit becomes a fail safe circuit which outputs a signal of the level "1" in response to an input alternating signal of the frequency $f_2$, and outputs a signal of the level "0" when a fault occurs in the amplifier or when the alternating signal (frequency $f_2$) of the input signals ceases.

According to the invention, therefore, processing is executed in a manner that maintains fail-safety. That is, if a fault has occurred in the air bag system, the air bag is not inflated, and if a crash has occurred the air bag is inflated without fail.

In the foregoing embodiment of the invention, the alternating signals are generated by a CPU module. The present invention, however, also encompasses a system in which the same signals are output from a plurality of programs having different versions, the results are compared by a fail-safe comparator, and alternating signals are output only when the results are in agreement. The present invention also encompasses a system in which the same processing steps are executed by a plurality of CPU modules, the results from the plurality of CPU modules are compared by a fail-safe comparator, and alternating signals are output only when the results are in agreement.

According to the present invention, the self-diagnosis and the result of crash-discrimination are based on programs of two versions, in order to guarantee fail-safety of the output signal of the air bag system. Therefore, any fault that has occurred in the air bag system can be reliably detected despite the fact that the system uses only one CPU. When a fault is detected, the output is fixed so that the air bag will not be inflated and, at the same time, the abnormality alarm device warns the driver of the occurrence of a fault in the air bag system. This assures that the air bag is not erroneously inflated by any fault occurring in the air bag. Moreover, unless the driver is informed of a fault in the air bag by the abnormality alarm device, the air bag is guaranteed to be reliably inflated in case a crash has occurred.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of operating an air bag igniter control apparatus have a crash sensor for detecting a condition indicative that a crash has occurred, a data processor, which evaluates signals from said sensor, and an abnormality indicator apparatus, said method comprising the steps of:

said data process continuously performing a self diagnostic function for detecting a failure in the data processor and a memory thereof when no signal is received from said sensor;

said data processor transmitting an abnormality signal to an abnormality indicator apparatus when a failure is detected;

wherein said self diagnostic function comprises the steps of:

executing a first version of a self diagnostic program which includes processing steps for checking for proper operation of at least said data processor, said memory, and a data bus of said data processor, and generating an output signal indicative of said proper operation;

executing a second version of said self diagnostic program which includes processing steps for checking for proper operation of at least said data processor, said memory, and a data bus of said data processor, and generating an output signal indicative of said proper operation, said processing steps and said output signal of said second version being different from said processing steps and said output signal of said first version; and comparing output signals of said first version with output signals of said second version.

2. Method according to claim 1,
wherein in said first version of said self diagnostic program, said data processor produces a first predetermined binary data word if no error is detected in said apparatus, and in said second version of said self diagnostic program, said data processor produces a second predetermined binary data word if n o error is detected in said apparatus; and
wherein bits of said second predetermined data word are complementary to corresponding bits of said first predetermined data word.

3. Method according to claim 2 wherein said comparing step comprises to steps of:
entering said first predetermined data word into a register in data processor;
reading contents of said register;
entering said second predetermined data word into said register in place of said first predetermined data word.
reading contents of said register;
Whereby when no error is detected in said apparatus, said reading steps generate a signal having a first predetermined frequency.

4. Method according to claim 3 comprising the further step of generating an alarm when said signal has a frequency other than said predetermined frequency.

5. Method of operating an air bag igniter control apparatus have a crash sensor for detecting a condition indicative that a crash has occurred, a data processor, which evaluates signals from said sensor, and an abnormality indicator apparatus, said method comprising the steps of:
said data process continuously performing a self diagnostic function for detecting a failure in the data processor and a memory thereof when no signal is received from said sensor;
said data processor transmitting an abnormality signal to an abnormality indicator apparatus when a failure is detected;
interrupting operation of said self diagnostic function when a signal is received from said crash sensor, indicating that a crash may have occurred; and
said data processor performing a crash discrimination function to determine whether a crash has occurred;
wherein said crash discrimination function comprises the steps of
executing a first version of a crash discriminating program which includes processing steps for checking for proper operation of at least said data processor, said memory, and a data base of said data processor, and generating an output signal indicative of said proper operation;
executing a second version of said self crash discrimination program which includes processing steps for checking for proper operation of at least said data processor, said memory, and a data base of said data processor, and generating an output signal indicative of said proper operation, said processing steps and said output signal of said second version being different from said processing steps and said output signal of said first version; and
comparing output signals of said first version with output signals of said second version.

6. Method according to claim 5,
wherein said data processor determines that a crash has occurred when said signal from said crash sensor exceeds a predetermined threshold value;
wherein in said first version of said crash discriminating program, said data processor produces a third predetermined binary data word if a crash has occurred, and a fourth predetermined binary data word if no crash has occurred;
wherein in said second version of said crash discriminating program, said data processor produces a fifth predetermined binary data word if a crash as occurred and a sixth predetermined binary data word if no crash has occurred; and
wherein bits contained in a first portion of said third binary data word are complementary to corresponding bits contained in a first portion of said fifth binary data word, and bits contained in a second portion of said fourth binary data word are complementary to corresponding bits of a second portion of said sixth binary data word.

7. Method according to claim 6 wherein said comparing step comprises the steps of:
entering the binary data word produced by said first version of said crash discriminating program into a register of said data processor;
reading contents of said register;
entering the binary data word produced by said second version of said crash discrimination program into said register;
reading contents of said register;
whereby when a crash is detected sequential reading of said first portion of said binary data words entered into said register produces a signal having a second predetermined frequency when a crash is detected, and sequential reading of said second portion of said binary data words entered into said register produces a signal having said second predetermined frequency.

8. Method according to claim 7 comprising the further step of generating an ignition signal when said signal generated by said first portion of said binary data words entered into said register has said second predetermined frequency.

9. Method of operating a vehicle air bag control system having a sensor for detecting a condition indicative that a crash has occurred, a single data processor which evaluates signals from said sensor, and an abnormality indicator apparatus, said method comprising the steps of:
said data processor continuously alternatively executing at least first and second versions of a self diagnostic program, said first and second versions of said self diagnostic program each including processing steps for checking for proper operation of at least said data processor, said memory and a data bus of said data processor, and generating a diagnostic signal indicative thereof, said processing steps and said diagnostic signal of said first version being different from said processing steps and said diagnostic signal of said second version;
comparing portion of said diagnostic signals generated by said first and second versions to generate a first diagnostic output signal when said air bag control system is operating without error, and a second diagnostic output signal when an error is detected.

10. Method of operating a vehicle air bag control system having a single data processor, comprising the steps of:
said data processor executing a first crash detection program to generate a first digital signal;
said data processor executing a second crash detection program to generate a second digital signal, said first and second crash detection programs each including processing steps to check for proper operation of at least said data processor and to generate said first and second digital signals, said processing steps and said first digital signals of said first crash detection program being different from said processing steps and second digital signals of said second crash detection program;
a first portion of said first digital signal comprising data bits which are complementary to data bits of a first portion of said second digital signal when a crash has occurred, and a second portion of said first digital signal comprising data bits which are complementary to data bits of a second portion of said second digital signal when a crash has not occurred;
alternately entering said first and second digital signals into a register and reading contents of said register,
generating an air bag ignition signal when a signal generated by alternately reading said first portions of said first and second digital signals generates an output having a first predetermined frequency.

11. An air bag apparatus comprising:
a crash sensor for sensing existence of a condition indicative that a crash may have occurred;
and air bag igniter;
a control module containing a data processor and a memory;
an abnormality indictor apparatus;
said data processor comprising means for continuously performing a self diagnostic function for detecting a failure in at least the data processor and the memory when no signal is received from said sensor, and for transmitting an abnormality signal to said abnormality indicator apparatus when a failure is detected; and
said data processor further comprising means for interrupting operation of said self diagnostic function when a signal is received from said crash sensor and for performing a crash discrimination function during said interruption, to determine whether a crash has occurred;
wherein said means for continuously performing a self-diagnostic function comprises a plurality of different versions of a self-diagnostic program;
wherein said means for interrupting and for performing a crash discrimination function comprises a plurality of different versions of a crash discrimination program;
wherein said abnormality signal is generated in response to a first comparison by said date processor of output results among said plurality of self diagnostic programs; and
wherein an air bag operation signal is generated in response to a second comparison by said data processor of results among said plurality of crash discriminating programs.

12. Apparatus according to claim 11 wherein results of said first and second comparisons are transmitted to a frequency logic fail-safe circuit.

13. Apparatus according to claim 12, wherein outputs of said data processor are transmitted to said frequency logic fail-safe circuit in the form of alternating signals of predetermined frequency.

14. Apparatus according to claim 13, wherein, when alternating signals are no longer output from said CPU module, or when the alternating signals having a frequency other than said predetermined frequency are transmitted, said frequency logic fail-safe circuit fixes signals transmitted to the air bag device to a value that is necessary for positively inhibiting inflation operation of the air bag.

15. Apparatus according to claim 14, wherein, when alternating signals are no longer output from said CPU module, or when the alternating signals having a frequency other than said predetermined frequency are transmitted, said frequency logic fail-safe circuit fixes signals fed to said abnormality alarm device to a value that is necessary for effecting the abnormality display operation.

16. A method of operating an air bag apparatus having an acceleration sensor, an air bag igniter, and a control means for outputting an operation signal to said air bag igniter, said method comprising the steps of:
generating a signal comprising a mixture of a first signal containing a first signal pattern indicating existence of a normal condition when a self diagnosis of said control means reveals a normal operating condition, and a second signal for operating said air bag igniting apparatus by means of a second signal pattern; and
outputting a signal indicating a failure of said control means in response to detection of a signal other than at least the first signal pattern and the second signal pattern.

17. A method of operating an air bag apparatus having an acceleration sensor, an air bag igniter, and a control means for outputting an operation signal to said air bag igniter, said method comprising the steps of:
performing a self diagnosis to detect a failure of said control means;
generating an interruption signal depending on an output from said control means;
outputting an operation signal to the air bag igniting apparatus in response to said interruption signal;
generating a signal indicating an abnormal condition when the self diagnosis of the control means reveals a failure;
generating a signal comprising a mixture of a first signal containing a first signal pattern indicating existence of a normal condition when a self diagnosis of said control means reveals a normal condition, and a second signal for operating said air bag igniting apparatus by means of a second signal pattern; and
outputting a signal indicating a failure of said control means in response to detection of a signal other than at least the first signal pattern and the second signal pattern.

18. A method of operating an air bag apparatus having an air bag igniter, an electric power source, an acceleration sensor, an abnormality alarm display, and a control means for outputting an operation signal to said air bag igniter, said method comprising the steps of:

performing a diagnosis to detect failures of said acceleration sensor, said air bag igniter, said abnormality alarm display, and said electric power source;

performing a self diagnosis to detect a failure of said control means;

generating an interruption signal depending on an output from said control means;

outputting an operation signal to the air bag igniting apparatus in response to said interruption signal;

generating a signal indicating an abnormal condition when at least one of the diagnoses of said sensor, said air bag igniter, said abnormality alarm display, said electric power source, and the self diagnosis of said control means, reveals a failure;

generating a signal comprising a mixture of a first signal containing a first signal pattern indicating existence of a normal condition when a self diagnosis of said control means reveals a normal condition, and a second signal for operating said air bag igniting apparatus by means of a second signal pattern; and outputting a signal indicating a failure of said control means in response to detection of a signal other than at least the first signal pattern and the second signal pattern.

19. A method of operating an air bag apparatus having an acceleration sensor, an air bag igniter, and a control means for outputting an operation signal to said air bag igniter depending on an output from said acceleration sensor, said control means comprising at least a data processor, a memory, and a frequency logic input/output device, said method comprising the steps of:

said data processor transmitting a predetermined signal to said frequency logic input/output device when said acceleration sensor generates an output;

said frequency logic input/output device transmitting an operation signal to said air bag igniting apparatus, based on a content of said signal from said frequency logic input/output device;

said control means performing diagnoses to detect failures of peripheral apparatus comprising said acceleration sensor, said air bag igniter, an abnormality alarm display, and an electric power source, when an output from said acceleration sensor does not exist;

said control means performing a routine self diagnosis to detect a failure thereof;

terminating transmission of said predetermined alternating signal from said processing means to said frequency logic input/output device when at least one of said diagnoses of said control means and said peripheral apparatus reveals a failure; and transmitting a signal indicating an abnormal condition from said frequency logic input/output device to said abnormal alarm display.

20. A method of operating an air bag apparatus having an acceleration sensor, an air bag igniter, and a control means for outputting an operation signal to said air bag igniter depending on an output from said acceleration sensor, said control means comprising at least a data processor, a memory, and a frequency logic input/output device, said method comprising the steps of:

said data processor transmitting a predetermined signal to said frequency logic input/output device when said acceleration sensor generates an output;

said frequency logic input/output device transmitting an operation signal to said air bag igniting apparatus, based on a content of said signal from said frequency logic input/output device;

said control means performing diagnoses to detect failures of peripheral apparatus comprising said acceleration sensor, said air bag igniter, an abnormality alarm display, and an electric power source, when an output from said acceleration sensor does not exist;

said control means performing a routine self diagnosis to detect a failure thereof;

terminating transmission of said predetermined alternating signal from said processing means to said frequency logic input/output device when at least one of said diagnoses of said control means and said peripheral apparatus reveals a failure;

fixing a characteristic of a signal from said frequency logic input/output device to said air bag igniting apparatus at a value necessary to positively inhibit operation of the air bag in response to said termination of transmission of said predetermined alternating signal; and fixing a characteristic of a signal from said frequency logic input/output device to said abnormality alarm display at a value necessary to operate said abnormality alarm display in response to said termination of transmission of said predetermined alternating signal.

21. An air bag apparatus comprising:

an acceleration sensor;

an air bag igniter;

a control means for outputting an operation signal to said air bag igniter;

means for generating a signal comprising a mixture of a first signal containing first a signal pattern indicating existence of a normal condition when a self diagnosis of said control reveals a normal condition, and a second signal for operating said air bag igniting apparatus by means of a second signal pattern; and means for outputting a signal indicating a failure of said control means in response to detection of a signal other than at least the first signal pattern and the second signal pattern.

22. An air bag apparatus comprising:

an acceleration sensor;

an air bag igniter;

a control means for outputting an operation signal to said air bag igniter;

means for performing a self diagnosis to detect a failure of said control means;

means for generating an interruption signal depending on an output from said control means;

means for outputting an operation signal to the air bag igniting apparatus in response to said interruption signal;

means for generating a signal indicating an abnormal condition when the self diagnosis of the control means reveals a failure;

means for generating a signal comprising a mixture of a first signal containing a first signal pattern indicating existence of a normal condition when a self diagnosis of said control means reveals a normal condition, and a second signal for operating said air bag igniting apparatus by means of a second signal pattern; and means for outputting a signal indicating a failure of said control means in response to detection of a signal other than at least the first signal pattern and the second signal pattern.

23. An air bag apparatus comprising:

an acceleration sensor;

an air bag igniter;

an electric power source;

an abnormality alarm display;

a control for outputting an operation signal to said air bag igniting apparatus;

means of performing diagnoses to detect failures of said acceleration sensor, said air bag igniter, said abnormality alarm display, and said electric power source;

means for performing a self diagnosis to detect a failure of said control;

means for generating an interruption signal depending on an output from said control;

means for outputting an operation signal to the air bag igniting apparatus in response to said interruption signal;

means form generating a signal indicating an abnormal condition when at least one of the diagnoses of said sensor, said air bag igniter, said abnormality alarm display, said electric power source, and the self diagnosis of said control, reveals a failure;

means for generating a signal comprising a mixture of a first signal containing a first signal pattern indicating existence of a normal condition when a self diagnosis of said control reveals a normal condition, and a second signal for operating said air bag igniting apparatus by means of a second signal pattern; and means for outputting a signal indicating a failure of said control in response to detection of a signal other than at least the first signal pattern and the second signal pattern.

24. An air bag apparatus comprising an acceleration sensor, an air bag igniter, and a control means for outputting an operation signal to said air bag igniter, wherein:

said control means comprises at least a data processor, a memory, and a frequency logic input/output device;

said data processor transmits a predetermined alternating signal to said frequency logic input/output device when said acceleration sensor generates an output, and simultaneously, said frequency logic input/output device transmits an operation signal to said air bag igniter, based on a content of said signal from said frequency logic input/output device;

said control means performs diagnoses to detect failure of peripheral apparatus comprising said acceleration sensor, said air bag igniter, an abnormality alarm display, and an electric power source, and also performs a routine self diagnosis, when an output from said acceleration sensor does not exist; and said transmission of the predetermined alternating signal from said processing means to said frequency logic input/output device is terminated when at least one of said diagnoses of said control means and said peripheral apparatus reveals a failure, and simultaneously, said frequency logic input/output device transmits a signal indicating an abnormal condition to said abnormality alarm display.

25. An air bag apparatus comprising an acceleration sensor, an air bag igniter, and a control means for outputting an operation signal to said air bag igniter, wherein:

said control means comprises at least a data processor, a memory, and a frequency logic input/output device;

said data processor transmits a predetermined alternating signal to said frequency logic input/output device when said acceleration sensor generates an output, and simultaneously, said frequency logic input/output device transmits an operation signal to said air bag igniter, based on a content of said signal from said frequency logic input/output device;

said control performs diagnoses to detect failure of peripheral apparatus comprising said acceleration sensor, said air bag igniter, an abnormality alarm display, and an electric power source, and also performs a routine self diagnosis, when an output from said acceleration sensor does not exist; and said transmission of the predetermined alternating signal from said data processor to said frequency logic input/output device is terminated when at least one of said diagnoses of said control and said peripheral apparatus reveals a failure, and simultaneously, a characteristic of a signal which is transmitted from said frequency logic input/output device to said air bag igniter is fixed at a value necessary to positively inhibit operation of the air bag, and a characteristic of a signal from said frequency logic input/output device to said abnormality alarm display is fixed at a value necessary to operate said abnormality alarm display.

* * * * *